United States Patent
Wiedeman et al.

(10) Patent No.: US 6,272,316 B1
(45) Date of Patent: *Aug. 7, 2001

(54) MOBILE SATELLITE USER INFORMATION REQUEST SYSTEM AND METHODS

(75) Inventors: Robert A Wiedeman, Los Altos; Paul A Monte, San Jose; Kent A Penwarden, Los Altos, all of CA (US)

(73) Assignee: Globalstar L.P., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/089,565

(22) Filed: Jun. 3, 1998

Related U.S. Application Data

(63) Continuation-in-part of application No. 08/559,081, filed on Nov. 17, 1995, now Pat. No. 5,812,932.

(51) Int. Cl.[7] ................................................ H04B 7/185
(52) U.S. Cl. .......................... 455/13.1; 455/12.1; 455/427
(58) Field of Search .......................... 455/12.1, 427–430, 455/455, 457, 450, 517, 566, 575; 342/357, 352, 353, 457

(56) References Cited

U.S. PATENT DOCUMENTS

Re. 32,905   4/1989   Baran ................................... 370/104
4,901,307    2/1990   Gilhousen et al. .

(List continued on next page.)

*Primary Examiner*—Doris H. To
(74) *Attorney, Agent, or Firm*—Ohlandt, Greeley, Ruggiero & Perle, L.L.P.

(57) ABSTRACT

A method in accordance with this invention for operating a satellite communications system of a type that has a plurality of earth orbiting satellites, at least one terrestrial user terminal, and at least one terrestrial gateway, includes steps of determining a location and an azimuthal orientation of the user terminal; determining locations of one or more satellites co-visible to the user terminal and to the gateway; determining a signal quality of paths to each satellite co-visible with the gateway; displaying a representation to an operator of the user terminal, the representation depicting at least the orientation of the user terminal, the determined locations of the one or more satellites, and the determined signal qualities for satellites that are in use and those that are not in use; and changing the location of the user terminal in response to the displayed representation. Also, an unattended user terminal located a desired geographical position can generate a map of the sky over a period of time, the map indicating satellite availability at the desired position. The map can subsequently be used by the user terminal and/or the gateway to schedule communications, thereby conserving one or both of system capacity and user terminal battery power.

33 Claims, 7 Drawing Sheets

U.S. PATENT DOCUMENTS

| | | |
|---|---|---|
| 5,010,317 | 4/1991 | Schwendeman et al. ........ 340/311.1 |
| 5,043,736 | 8/1991 | Darnell et al. . |
| 5,073,900 | 12/1991 | Mallinckrodt ............................ 375/1 |
| 5,081,703 | 1/1992 | Lee ........................................ 455/13 |
| 5,109,390 | 4/1992 | Gilhousen et al. ....................... 375/1 |
| 5,119,225 | 6/1992 | Grant et al. ........................... 359/172 |
| 5,187,805 | 2/1993 | Bertiger et al. . |
| 5,216,427 | 6/1993 | Yan et al. .............................. 342/352 |
| 5,233,626 | 8/1993 | Ames ....................................... 375/1 |
| 5,235,633 | 8/1993 | Dennison et al. . |
| 5,239,671 | 8/1993 | Linquist et al. ..................... 455/13.1 |
| 5,303,286 | 4/1994 | Wiedeman ............................. 379/59 |
| 5,313,215 | 5/1994 | Walker et al. . |
| 5,323,164 | 6/1994 | Endo . |
| 5,339,330 | 8/1994 | Mallinckordt ............................ 375/1 |
| 5,410,728 | 4/1995 | Bertiger et al. . |
| 5,415,368 | 5/1995 | Horstein et al. .................. 244/158 R |
| 5,422,647 | 6/1995 | Hirshfield et al. . |
| 5,433,726 | 7/1995 | Horstein et al. . |
| 5,439,190 | 8/1995 | Horstein et al. ...................... 244/158 |
| 5,444,450 * | 8/1995 | Olds et al. ........................... 455/12.1 |
| 5,446,756 | 8/1995 | Mallinckrodt ........................ 375/200 |
| 5,448,623 | 9/1995 | Wiedeman et al. . |
| 5,463,400 * | 10/1995 | Tayloe .................................. 455/12.1 |
| 5,552,795 * | 9/1996 | Tayloe et al. .......................... 455/427 |
| 5,583,514 * | 12/1996 | Fulop .................................... 342/359 |
| 5,749,044 * | 5/1998 | Natarajan et al. ................... 455/12.1 |
| 5,812,932 * | 9/1998 | Wiedeman et al. ................... 455/427 |
| 6,070,051 * | 5/2000 | Astrom et al. ....................... 455/12.1 |

* cited by examiner

TRACK OF SATELLITE "B" FOR TIME (T TO T+DELTA T)

POSITION OF SATELLITE "A" (AT TIME=T)

POSITION OF SATELLITE "B" (AT TIME=T)

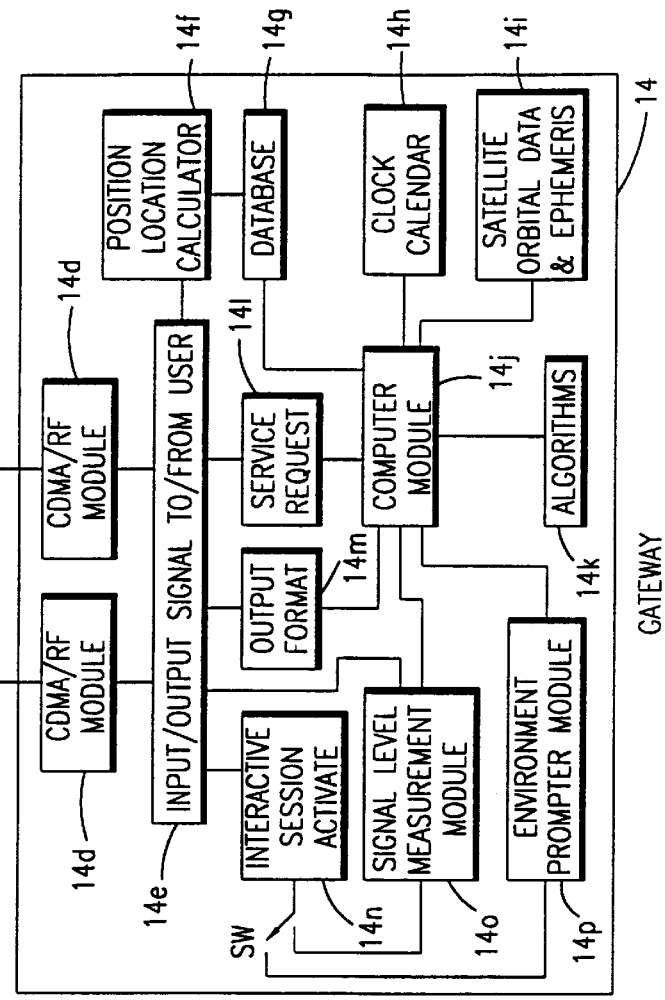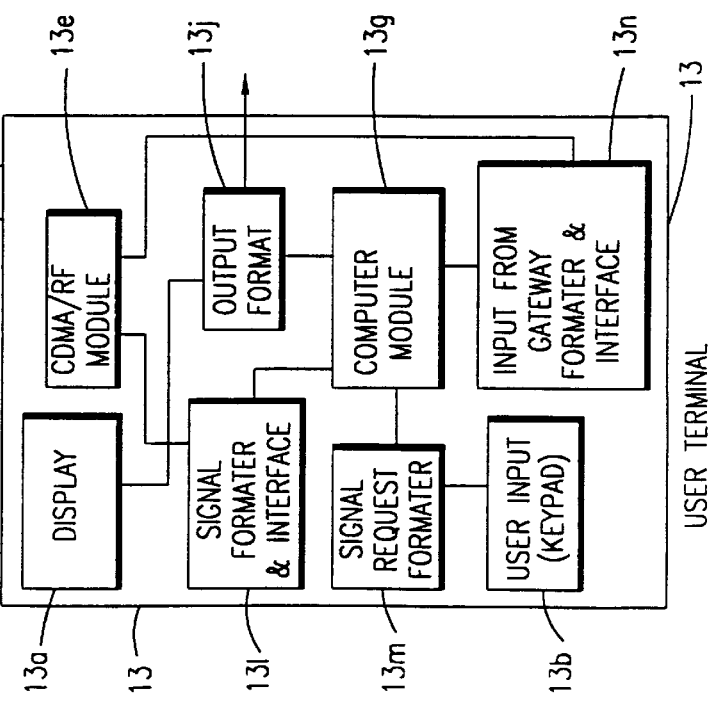

USER TERMINAL DISPLAY
BEFORE ESTABLISHING LINKS

USER TERMINAL DISPLAY
AFTER ESTABLISHING LINKS

MOBILE SATELLITE USER INFORMATION REQUEST SYSTEM AND METHODS

CROSS-REFERENCE TO A RELATED PATENT APPLICATION

This patent application is a continuation-in-part of U.S. patent application Ser. No. 08/559,081, filed Nov. 17, 1995, now U.S. Pat. No. 5,812,932 entitled "Mobile Satellite User Information Request System and Method", by Robert A. Wiedeman, Paul A. Monte, and Kent A. Penwarden, the disclosure of which is incorporated by reference herein in its entirety.

FIELD OF THE INVENTION

This invention relates generally to communications systems having mobile users and, in particular, to satellite-based communications systems wherein mobile user terminals are connected via at least one satellite to a terrestrial communications system.

BACKGROUND OF THE INVENTION

Mobile communications systems, and in particular Global Mobile Communications Systems employing a constellation of earth orbiting satellites, can exhibit blocking and shadowing of users which are attempting to connect or remain connected to one or more of the satellites. The satellites relay duplex user RF signals to terrestrial-based gateways for further connection to, by example, the Public Switched Telephone Network (PSTN). However, if the access of a given user is blocked to one or more satellites, the user may experience an inability to log onto the system, to initiate or receive calls, or to continue a call that is in progress. This problem is especially apparent when the user is a mobile user, and is in motion with respect to possible RF obstructions, such as foliage and buildings.

With known types of mobile user satellite systems, particularly geosynchronous satellite systems, generally only one satellite is in view of the user. Furthermore, the location of the satellite, on or about the equator, specifies the direction from the user to the satellite. In the northern hemisphere this direction is generally south.

However, recent advances in the communication, computer, and small satellite technology has enabled the concept of providing a constellation of satellites, wherein over large portions of the Earth's surface at least two satellites can be in view of any location. Furthermore, the development of hand-held user terminals using Code Division Multiple Access (CDMA) has made possible multiple satellite coverage employing diversity techniques as a means of mitigating shadowing and blocking of users. By example, a user terminal is enabled to maintain a connection simultaneously through two or more sat ellites of a constellation of LEO satellites that are simultaneously in view.

One problem that is presented when deploying a constellation of, by example, Low Earth Orbit (LEO) satellites is that the user generally cannot directly perceive the best direction to either face or move to in order to maximize his or her ability to establish or maintain communications through one or more of the satellites. This is because the satellites are in motion with respect to the user, and furthermore the satellites may not be, at any given time, located in some predetermined and essentially constant direction with respect to the user (i.e., south as in the geosynchronous satellite case).

For a constellation of earth orbit satellites (in non-polar orbits) it can be shown that the portion of the sky wherein a user will "see" the satellites is a function of latitude. At the equator (0° latitude) the sky is uniformly covered by satellite tracks, whereas at approximately 70° north latitude in only a relatively small portion of the southern sky will a user see a satellite. For intermediate latitudes the size of the region wherein no satellites are found, referred to herein as "obscura", grows progressively small as the equator is approached. The southern latitude case is the mirror image of the northern latitude case for circular orbits.

Furthermore, in a typical case a variety of signal blocking obstructions are found, such as buildings, utility poles, trees, etc., in addition to the region wherein no satellites pass (obscura). It should be apparent that at any given time only a portion of the sky may be optimum for carrying a communication between a terrestrial user terminal and one or more of the satellites.

This problem is compounded if the user is located within a building, as the relatively high frequencies (e.g., S-band) that may be used on the forward link between the satellite and the user terminal will not normally penetrate to any great distance within the building. As a result, the user will typically experience better link quality if the user is located near to a window through which the satellite(s) can be "seen".

It might be thought that if a user would always go to a south-facing window (in the northern hemisphere) that the best link quality will always be experienced. However this may not be the case. By example, assume that the user is being provided with two satellite diversity (i.e., a communication is being simultaneously conveyed through two satellites) and that three satellites are in view. Depending on which two satellites are being used, in one case a south-west facing window may be optimum, while for the second case a south-east facing window may be optimum. In either case a north-facing window would most likely provide for the poorest link quality (absent some fortuitous placement of signal reflecting surfaces).

It is an object of this invention to provide improved methods and apparatus to assist a user of a mobile communication satellite system to log on to, initiate and receive calls, and maintain calls.

SUMMARY OF THE INVENTION

The foregoing and other problems are overcome and the object of the invention is realized by methods and apparatus that enable a user to gain knowledge of a direction to one or more "best" satellites available to the user. This information enables the user to alter his or her position to take advantage of the one or more "best" satellites at any particular time in order to facilitate the ability to log-on, initiate and receive calls, and complete calls. The information can be supplied by the serving system, and can be employed by the user to select for a period of time, by example, a position on an east side of a building, to move to a south-east facing window, or to take some other action that enhances the user's connectivity potential to the satellite communications system.

This teaching of this invention exploits the fact that a gateway within whose service area a user terminal is located is aware of the location (latitude and longitude) of the user terminal, and can compute from satellite ephemerides data the locations and elevation angles of all satellites in view of the user terminal. Alternatively, the gateway can send satellite ephemerides data to the user terminal, which can then compute the locations and elevation angles of the satellite(s) in view.

The gateway has knowledge of the current state of the satellite paths that are co-visible (simultaneously visible to both the gateway and the user terminal), i.e., whether the paths are clear, impaired (by shadowing or specular reflection), or blocked. This knowledge is gained from the power required to close the forward and reverse communication links between the user terminal and gateway.

The link status information to the user can be automatically generated and sent by the gateway, or may be generated and sent by the gateway only in response to a request from the user. By example, if the user keys in a predetermined code into the keypad, the code is sent on the return link, via one or more satellites, to the gateway.

A method in accordance with this invention for operating a satellite communications system of a type that has a plurality of earth orbiting satellites, at least one terrestrial user terminal, and at least one terrestrial gateway, includes steps of determining a location and an azimuthal orientation of the user terminal; determining locations of one or more satellites co-visible to the user terminal and to the gateway; determining a signal quality of paths to each satellite co-visible with the gateway; displaying a representation to an operator of the user terminal, the representation depicting at least the orientation of the user terminal, the determined locations of the one or more satellites, and the determined signal qualities for satellites that are in use and those that are not in use; and changing the location of the user terminal in response to the displayed representation.

In the presently preferred embodiment the step of determining the locations of the one or more satellites includes a step of determining an elevation angle of each of the one or more satellites relative to the location of the user terminal, and the step of displaying also displays a representation of the determined elevation angle. The step of displaying may also include an initial step of transmitting path quality information from the gateway to the user terminal through at least one satellite, and/or from the user terminal to the gateway through at least one satellite.

Further in accordance with this invention the step of displaying includes a step of displaying a graphic presentation of the sky which comprises indications of the location, elevation angle and direction of movement of the co-visible satellites, and also an azimuthal orientation of the user terminal. The graphic presentation of the sky may also include an indication of an obscura region of the sky that is devoid of satellites.

Also disclosed is a method for increasing system capacity of the satellite communications system. This method includes steps of: in accordance with at least a current or future satellite availability at a current or future location of the user terminal, transmitting information to the user terminal via at least one satellite; and using the transmitted information to generate a graphical display for an operator of the user terminal, the graphical display enabling the operator to position the user terminal at a location that minimizes an amount of satellite power required to maintain a communication link with the user terminal.

A related method extends user terminal battery life (time between required rechargings). In this method the graphical display enables the operator to position the user terminal at a location that minimizes an amount of battery power required to maintain the communication link with the user terminal.

Another method in accordance with this invention occurs during a time that a telephone call is connected between the user terminal and the gateway through at least one satellite. In this method the user terminal signals the gateway that a repositioning of the user terminal will take place. The gateway then places the telephone call on hold for the purpose of allowing the operator to reposition the user terminal to a location which provides for improved signal quality, so as not to inadvertently drop the call while the user terminal is being repositioned. The operator then repositions the user terminal, and may then signal the gateway, enabling the telephone call to proceed. The step of placing the telephone call on hold preferably includes a step of sending a signal to the other party to the telephone call for indicating that the call is on hold.

In accordance with yet a further method of this invention the user terminal stores a record of at least one predetermined geographical location from where the user terminal is expected to desire communication, and an indication of satellite availability at the at least one location over a period of time. The user terminal then transmits the stored record to the gateway that serves the user terminal for storage in the gateway. Subsequently, the system is enabled to establish communication with the user terminal in accordance with at least one of the stored records.

The step of storing the record in the user terminal includes steps of receiving signals, such as pilot channel signals, from satellites over a sufficiently long period of time to accumulate a record of received signal quality, and associating the received signal quality record with stored satellites ephemerides data to create a map of the sky, with received signal quality associated with positions of the satellites.

The step of establishing communication may include steps of predicting when satellites will be in positions in the sky for providing favorable communications with the user terminal; and scheduling a future communication from the location to coincide with favorable satellite positions in the sky. The step of scheduling can include a step of displaying to the operator of the user terminal at least a time of occurrence of the favorable satellite positions and a duration of the favorable satellite positions. The user terminal or the gateway may store a queue of messages for later automatic transmission during a time when it is predicted that satellites will be in positions in the sky providing favorable communications with the user terminal. The gateway may also initiate a communication with the user terminal during a time when it is predicted that satellites will be in positions in the sky providing favorable communications with the user terminal, when the user terminal has registered at the predetermined location, and may alert another party that the user terminal will be available for communication at the predicted time.

BRIEF DESCRIPTION OF THE DRAWINGS

The above set forth and other features of the invention are made more apparent in the ensuing Detailed Description of the Invention when read in conjunction with the attached Drawings, wherein:

FIG. 8 block diagram of a satellite communications system of this invention having a gateway assisted user information request and interactive user terminal.

DETAILED DESCRIPTION OF THE INVENTION

Figure 1A:
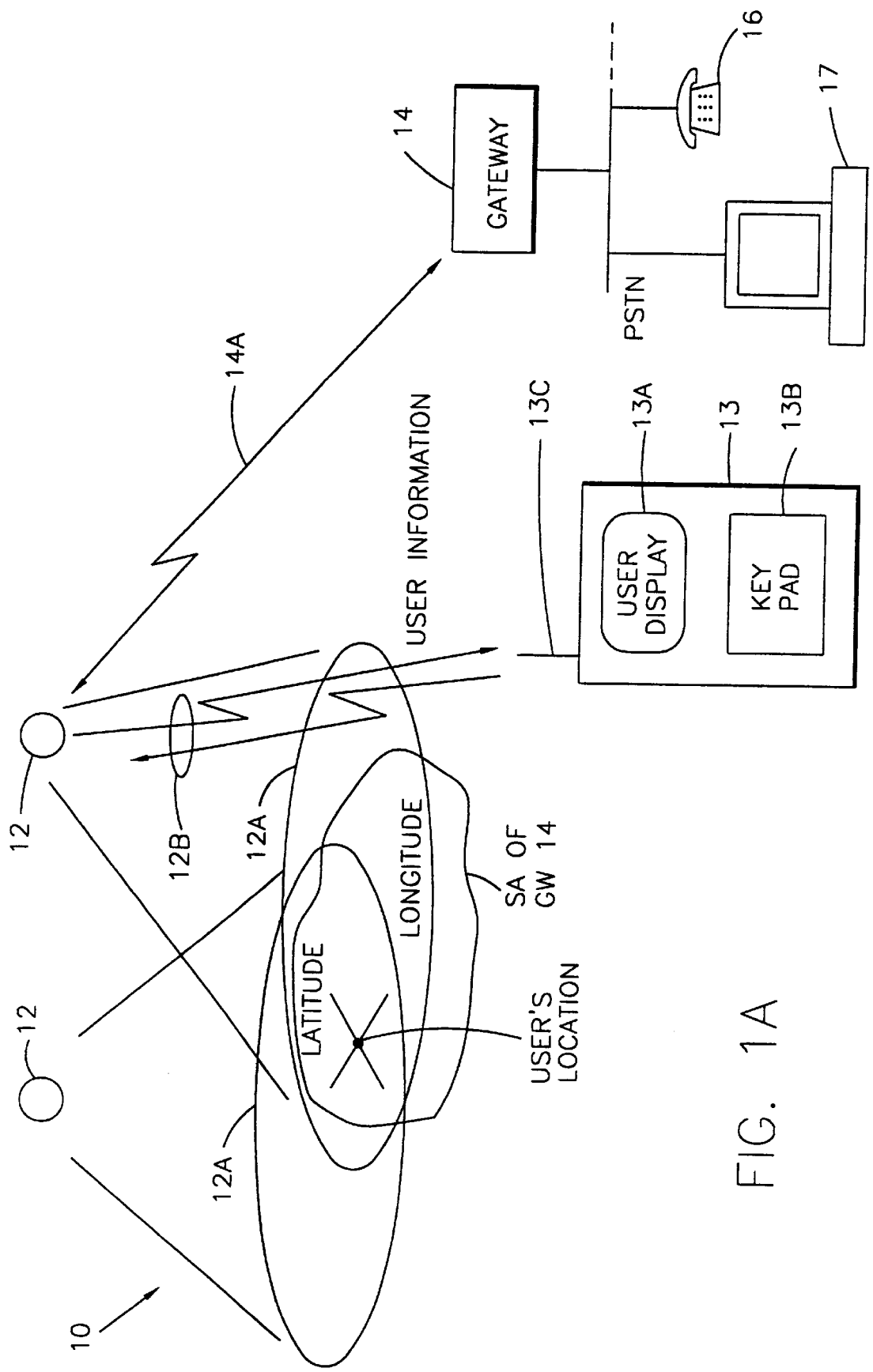
FIG. 1 is simplified block diagram of a satellite communications system in accordance with this invention.

Reference is made now to FIG. 1 for illustrating a portion of a LEO satellite communications system 10 that operates in accordance with this invention. Although described below in the context of a LEO satellite communications system, it should be realized that the teaching of this invention is also applicable to other than LEO systems, such as medium earth orbit (MEO) systems and to non-geosynchronous satellite communication systems in general.

A plurality of satellites 12 of a satellite constellation each have an associated "footprint" 12a that is projected on the surface of the Earth and that moves with the satellite. A user terminal 13 has a display 13a, a key pad 13b, and an antenna 13c. Using suitable RF circuitry (not shown in FIG. 1) and the antenna 13c the user terminal 13 is able to send requests to, and receive information from a terrestrial gateway 14. The requests and information are relayed by at least one of the satellites 12 with RF links 12b to the antenna 13c, and with RF feeder links 14a to the gateway 14. The ephemeris and location of the satellites 12 is known by the gateway 14, and is also preferably known by the user terminal 13.

In the presently preferred embodiment of this invention the gateway 14 is connected to the PSTN, providing a communication path from the user terminal 13 to terrestrial telephones 16 and/or terrestrial data facilities, shown generally as a computer 17.

The footprints of satellites 12 are shown to both be illuminating a service area (SA) of the gateway 14. The user terminal 13 is at one particular location within the SA, and is thus positioned at a particular latitude and longitude. The gateway 14 knows the location of the user terminal 13, in that the gateway 14 calculates the user terminal's position at the time of log-on and registration to the system. The gateway 14 can use, by example, the system's own ability to the calculate the user's position (such as by triangulation), and/or can employ Global Positioning Satellite (GPS) information or other known types of techniques. Furthermore, and by example, the location of the user terminal 13 may also be determined by the gateway 14 for each telephone call, prior to authorizing connection.

Figure 2A:
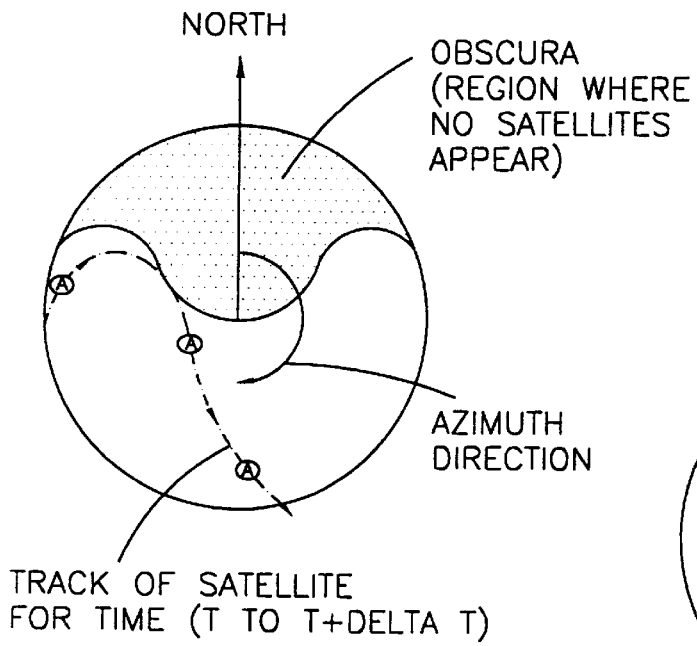
FIGS. 2A and 2B are each a view of the sky directly above a user terminal, and illustrate a satellite-devoid region referred to herein as "obscura" and also a track of two satellites ("A" and "B") with respect to time.
Figure 2B:
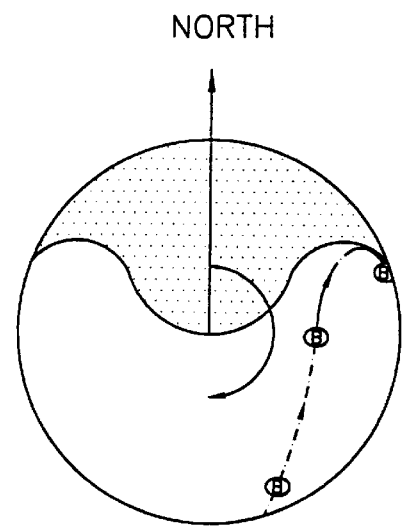

Referring now to FIGS. 2A and 2B, there is shown a view of the sky (a "fisheye" view) looking directly upwards from a user terminal 13. The user terminal 13 is assumed to be positioned at the center of the circle. As a result of the specifics of the particular satellite constellation, there exists a region of sky where the satellites 12 appear, and a region of sky where no satellites are ever visible. The relative sizes and shapes of these two regions depend on the inclination of the orbit, the height of the orbit, the ellipticity of the orbit, and the latitude and longitude of the user. The region where the satellites 12 never appear is referred to herein as "obscura". Any satellites 12 which are within the view of the user terminal 13 are thus located in the remaining region, and will appear there either singly or in groups, depending on the number of satellites in the constellation, the height of the orbit, the inclination, and the ellipticity of the orbit. FIGS. 2A and 2B reflect the case for circular inclined orbits of about 1400 km and a user terminal positioned at about 45° north latitude.

It should be noted that the relative size of the obscura region changes with latitude (i.e., at higher latitudes the relative size of the obscura region grows larger for the example shown). As the constellation of satellites 12 revolves about the earth the positions of the satellites 12 change with time.

By example, in a presently preferred but not limiting embodiment of this invention there are a total of 48 satellites 12 in a 1414 km Low Earth Orbit (LEO). The satellites 12 are distributed in eight orbital planes with six equally-spaced satellites per plane (Walker constellation). The orbital planes are inclined at 52° with respect to the equator and each satellite completes an orbit once every 114 minutes. This approach provides approximately full-earth coverage with, preferably, at least two satellites in view at any given, time from a particular user location between about 70° south latitude and about 70° north latitude. As such, a user is enabled to communicate to or from nearly any point on the earth's surface within a gateway 14 coverage area to or from other points on the earth's surface (by way of the PSTN), via one or more gateways 14 and one or more of the satellites 12, possibly also using a portion of the telephone infrastructure segment represented by the PSTN.

From FIGS. 2A and 2B it can be realized that the direction of the "best" satellites in azimuth around the user terminal 13 can be calculated, either by the user terminal 13, or by the gateway 14. What is necessary to make such a calculation is a knowledge of the location of the user terminal, the compass heading (orientation) of the user terminal, the ephemerides of the satellites, the date, and the time of day.

Figure 3A:
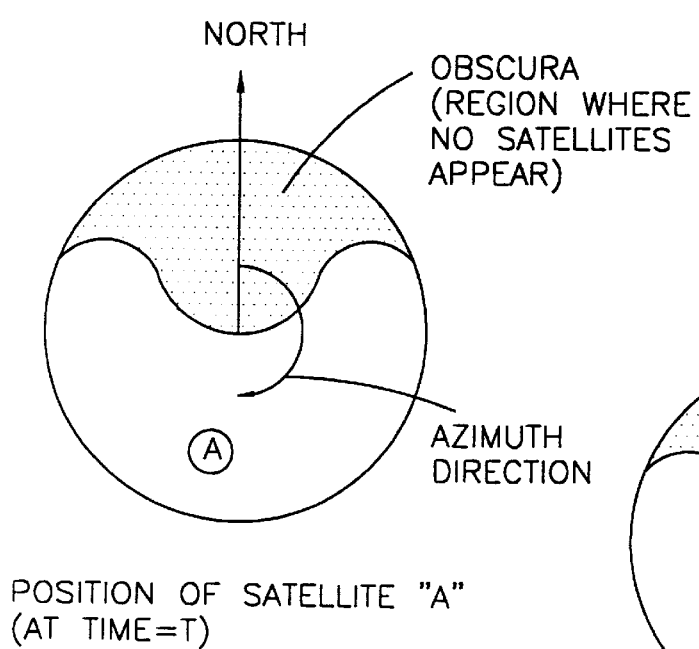
FIGS. 3A and 3B illustrate the positions of satellites "A" and "B" with respect to the user terminal at a given instant in time.
Figure 3B:
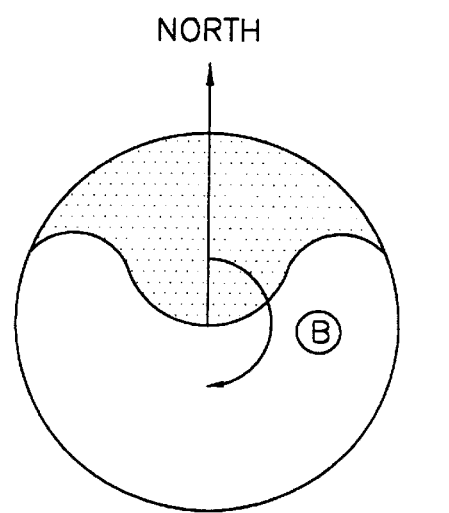
Figure 4:
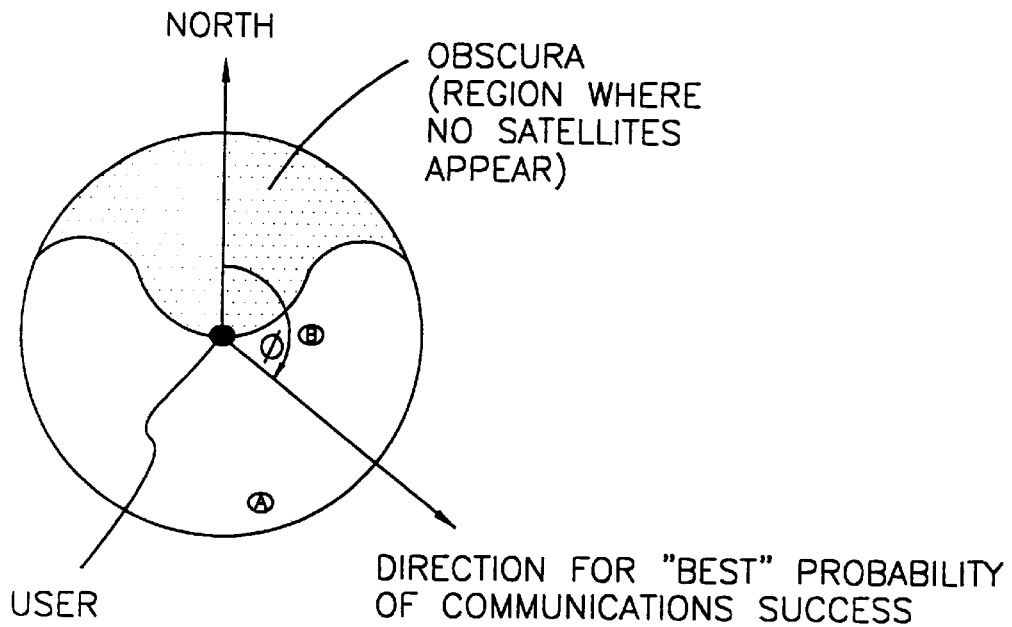
FIG. 4 illustrates the two satellite positions of FIGS. 3A and 3B superimposed in the view of the sky over the user terminal, and further illustrates, relative to the user terminal, a direction having a highest probability for communications success when simultaneously communicating through both satellites "A" and "B" (i.e., using two satellite diversity)

FIG. 2A shows the motion of a satellite 12, designated as "A", over the user terminal 13. The satellite "A" moves from low on the horizon to a highest point, returning to the horizon after crossing a portion of the sky open to the user terminal. Should an obstruction be located in the azimuthal and elevation angle which would obscure the satellite 12, the line of sight to and therefore the communications with the user terminal 13 is interrupted. FIG. 2B shows a motion of a second satellite "B" during the same period of time as that shown for satellite "A". Note that they do not coincide. By example, the position of satellites "A" and "B" at a particular instant in time is shown in FIGS. 3A and 3B, while FIG. 4 shows the satellites "A" and "B" superimposed, at the same instant of time, within the clear sky region over the user terminal 13. Although two satellites are shown in these Figures, it should be realized that at any given time there may be more than two satellites in view of the user terminal 13.

Various techniques can be employed to estimate the "best"direction in order to affect maximum communications performance. As but one example, an estimate of the azimuth direction which would "split" the two satellites can be obtained by calculating a first azimuth direction to satellite "A", then a second azimuth direction to satellite "B", deriving the difference of the two, dividing the difference by two, and adding the result to the first determined azimuth direction. In accordance with an aspect of this invention, the result may then be used to direct the user to some optimum location, position and/or orientation to effect maximum communications performance.

As employed herein a determined "best position" of the user terminal 13 is intended to encompass at least one of the location (e.g., latitude and longitude) of the user terminal, the elevation of the user terminal (e.g., floor of multi-storied building), or the orientation of the user terminal and/or user terminal antenna (e.g., an angular orientation with respect to the determined "best" direction to one or more of the satellites 12).

A user terminal with stored satellite ephemerides may autonomously display satellite locations relative to the user terminal without being in communication with the gateway 14, provided that the approximate location of the user terminal has been previously determined by GPS, by the satellite communications system, or by other means.

If all satellite paths are blocked, the user may examine the display of satellite locations on the user terminal and compare it to the surrounding environment, and thereby determine where satellites would be relative to environmental obstructions. This aspect of the invention is described in further detail below in reference to FIGS. 9A and 9B. By observing the user terminal display 13a while changing location, the user can position one or more satellites 12 into a favorable portion of the sky that is unobstructed by local environmental objects. For example, by observing that a building is located in the direction of a given satellite 12, simply moving to the side of the building or by moving back away from the building could provide a clear path from the user terminal 13 to the satellite.

Figure 9A:
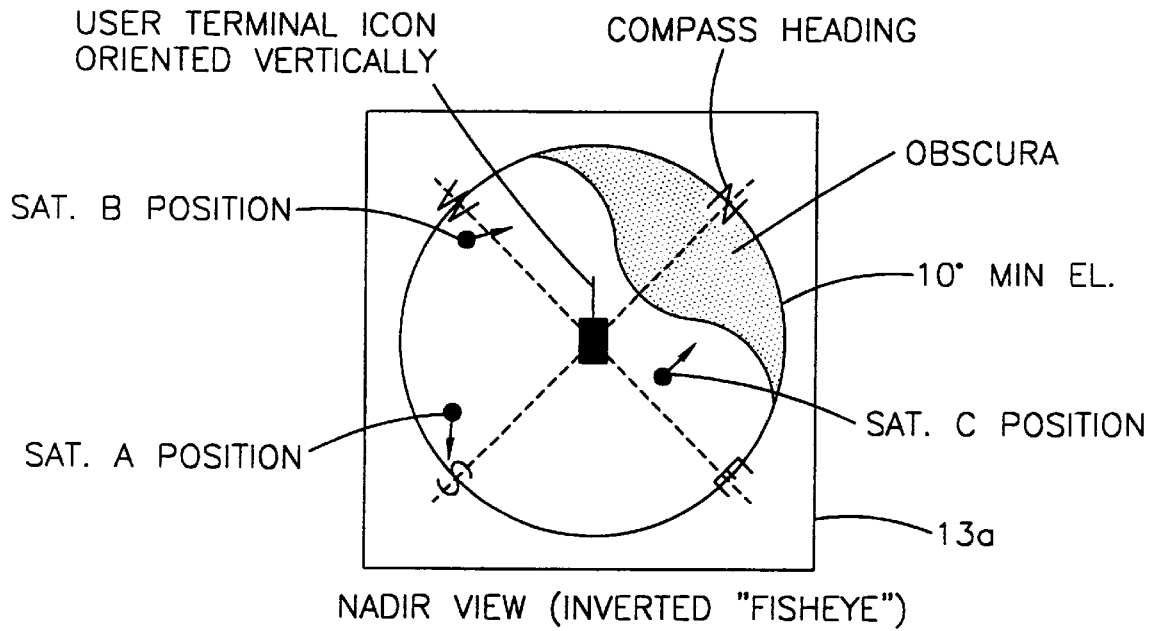
FIGS. 9A and 9B depict two exemplary user terminal displays wherein user terminal orientation information is employed to assist in positioning the user terminal at an optimum location for communication via one or more satellites.
Figure 9B:
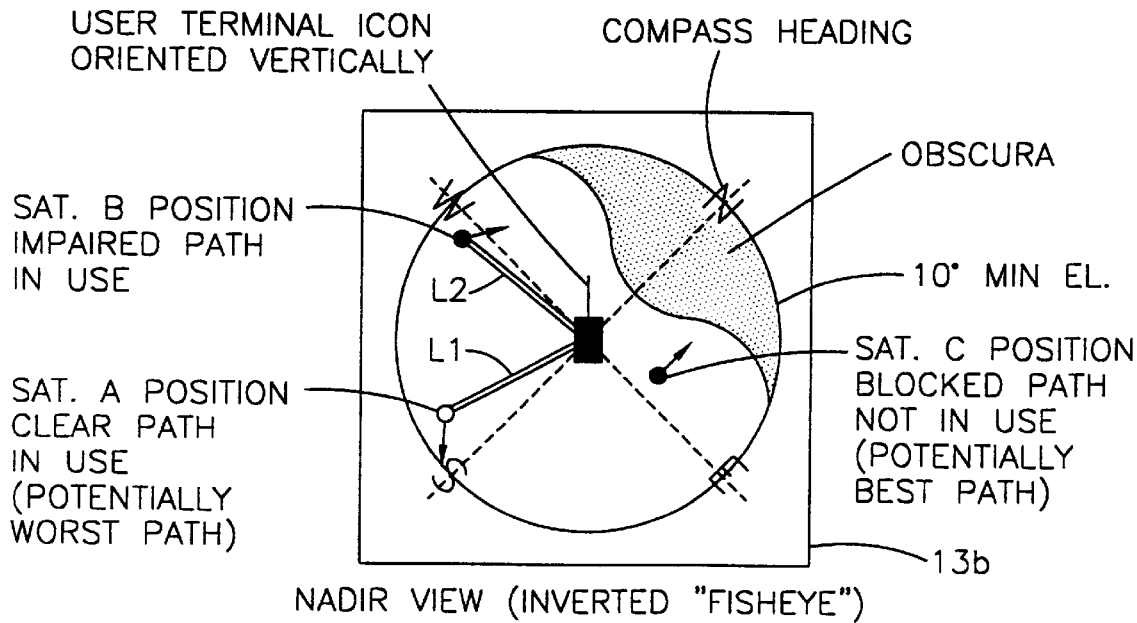

Reference is now made to FIGS. 9A and 9B for illustrating exemplary display 13a formats. FIG. 9A shows a case before communication links are established between any co-visible satellites (A–C), and is useful to locate the satellites in the sky. The satellite locations may be calculated by the user terminal 13, using a last known location of the user terminal, or by using a GPS or similarly obtained-location if available.

FIG. 9B shows a case where links (L) have been established between the user terminal 13 and the satellites A and B (links 1 and 2), and thus link quality information can be determined. Satellite C, although currently at the highest elevation angle and thus having the potential to provide the best communication path, is assumed to be currently blocked by some obstruction. The display 13b can be operated so as to provide a visual indication of which satellite paths, relative to the user terminal 13, are currently "best", or impaired but useable, or unusable. For example, the satellite A is at the lowest elevation angle, but a clear path exists between that satellite and the user terminal. Satellite B is at a higher elevation angle than satellite A, but the path is impaired (that is, the gateway 14 detects from the amount of power required to maintain the link that some RF impairment, such as foliage or a rain cell, lies along the path). Satellite C, while having the highest elevation angle and potentially the best path, is currently blocked and unusable. In this case each satellite "icon" is made visually distinct (e.g., a clear circle, a lightly shaded circle, and a heavily shaded circle (e.g., each satellite in FIG. 9A would be shown as solid black since no links have yet been established)). The display is thus presented on the user terminal 13 or on a computer display communicating through the user terminal 13. For example, an LCD display on the front surface of the user terminal 13 could be used. To observe this display, the user holds the user terminal 13 in an upright position with the antenna 13c oriented vertically and the display 13a facing the user. The internal, electronically-readable compass 15b, in a preferred but not limiting embodiment, operates in this orientation.

The compass 15b causes the displayed circle containing the four compass points to rotate about the icon of the user terminal 13, which is in the center of the display. The user terminal icon would preferably remain constantly vertically oriented. This is a vertical depiction of the actual horizontal orientation of the user terminal with respect to the compass-heading direction in which the user is facing, as it would be viewed overhead of the user.

The compass presentation may also include a display of the "obscura" region of the sky, which is devoid of satellites, indicating to the user the unusable portion of the sky.

The icons representative of the satellites 12 that are co-visible to the user terminal 13 and to the gateway 14 may be displayed in polar coordinates, in their proper azimuthal orientation to the user terminal 13 and to the compass heading, as well as the satellite elevation angle above the 10° minimum elevation angle. Since the user terminal icon is located at the center of the display 13a, a satellite 12 would be directly overhead at a 90° elevation angle (zenith).

Those satellites 12 that are in view but not co-visible with the gateway 14 that is serving the user terminal 13 are preferably not displayed to the user.

Those paths or links that are selected to be in use by the gateway 14 in transmitting to the user terminal 13 may be displayed by a connecting line from the user terminal icon to the satellite icon, as in FIG. 9B. A satellite not being used would be displayed without its associated path.

Note that in FIG. 9A no links are displayed, since it is assumed that the user terminal 13 has not yet established a communication connection with the gateway 14. The links shown in FIG. 9B may be those used during a call, and may thus reflect signal strength and/or link quality, such as a frame error rate (FER). Alternatively, the links shown in FIG. 9B may result from the user terminal 13 simply monitoring pilot channels received through the co-visible satellites. In this case the link indications may be based on pilot channel signal strength. If monitoring pilot channels the user terminal 13 may also be relaying the results of pilot channel measurements back to the gateway 14. In this case the gateway 14 may assume that the satellite C is blocked from the user terminal, since the gateway 14 knows the relative locations of the user terminal 13 and the satellite 12, and since the user terminal 13 does not report any pilot channel measurements for satellite C.

As was stated above, the signal quality of the paths or links may be displayed by color coding or gray-scale coding of the displayed paths and the associated satellite icon. For instance, a clear coloring could indicate a clear path, a gray coloring an impaired path, and a black coloring (of the satellite only) a blocked path.

FIG. 9B presents an example of the-user terminal 13 facing northwest. Three satellites are co-visible with the gateway 14 that serves the user terminal 13, and two satellites are in use; satellite A has a path with the user terminal that is clear while satellite B has a path that is impaired, possibly by tree shadowing or by specular reflections. Satellite C, while having the highest elevation angle, has its path blocked and is not in use. Furthermore, satellite A is moving lower in elevation angle, as indicated by the attached arrow showing satellite direction, and will soon be below the minimum 10° elevation angle.

A user observing this display would conclude that it would be best to move to a location where satellite C could be used. Because the path with satellite C is shown to be blocked, yet satellite C is at a high elevation angle, a visual glance to the user's right should most likely identify the object that is blocking the path. A better location to communicate with satellite C might then be identified at a short distance away. If the blocking object is a building or tree next to the user, walking away from the object, up the street or across the street, should provide a clear path in the direction indicated to the desired satellite C.

Considering that satellite A is in use but low in elevation angle, a potential exists to drop the call while repositioning the user terminal to a better location. The user anticipating this possibility may then, in accordance with an aspect of this invention, place the call on hold by signaling the gateway 14, which in turn signals the other party to remain on the line.

Once in the better location, the display 13a would change. The relative position of the satellites 12 with respect to the user terminal 13 would remain relatively unchanged. However, the paths in use and the signal quality indicated would change to show the path to satellite C in use and in the clear condition. The display may have rotated if the user terminal 13 has changed in orientation with respect to the compass heading.

The user would then take the call off hold, such as by depressing a predetermined key on the keypad 13b which generates signalling to the gateway 14, and then continues the conversation in progress. It should be noted that the gateway 14 itself may determine that the signal quality of one or more of the satellite paths have improved significantly, and may automatically take the call off of hold.

In greater detail, during a telephone call that is connected between the user terminal 13 and the gateway 14 through at least one of the satellites 12, this method interrupts the telephone call for the purpose of allowing the operator to reposition the user terminal 13 to a location which provides for improved signal quality. Such an interruption may be of long enough duration to normally cause the system to drop the call. While still in a perhaps impaired or potentially impaired signal quality condition, this method allows the user to take action to signal the gateway by mean s of the user terminal that a repositioning will take place. The gateway 14 then places the call on hold until the operator achieves the condition of improved communication. During the hold period, the gateway 14 may provide to the other party an aural signal or digital signal for display indicating that the call is on hold. Upon achieving a better location for communication, the method allows the user to take action to remove the call from hold and proceed with the conversation.

Further in accordance with an aspect of this invention, for the case of an unattended, stationary user terminal, after some period of time the user terminal 13 may automatically record those times when satellite communication is best, thereby mapping the sky from the location of the stationary user terminal. This recording could be of the pilot signal powers of the various satellites 12 as they move in their tracks (FIGS. 2A and 2B), thereby requiring no extra power from the satellites 12 or from the user terminal 13. At an appropriate, favorable time-the unattended user terminal 13 may transmit this information to the gateway 14 for storage. Thereafter, knowing the open (unimpaired) areas of the sky, the system may predict when and for how long future satellites will be in the favorable position(s) for that particular user terminal location. The gateway 14 and the user terminal 13 may then know beforehand not to transmit during unfavorable times, thereby saving satellite power, which enhances system capacity and saves user terminal battery power, thereby extending operating time. That is, at least one of the user terminal 13 or the gateway 14 is enabled to make a call set-up decision using the stored record, a current time, and a current location of the user terminal 13.

The location of an unattended, stationary user terminal 13 may be near to a location frequented by the user, such as a window sill at home, office, or conference room, whose location coordinates may be previously stored in the user terminal memory and subsequently identified by entering an abbreviated code.

In further detail, this aspect of the invention provides a method for storing often used or preferred geographical locations from where the user would be expected to desire communication. The method furthermore provides a technique whereby an unattended, stationary user terminal 13 receives, for example, pilot signals from the satellites 12 over a sufficiently long period of time, and stores the record of the received signal quality, whether it be signal strength, bit error rate, frame error rate, some other metric, or a combination of these metrics. The user terminal 13 may then associate the signal quality record with the stored satellite ephemerides data and thereby create a map of the sky with signal quality associated with position of the satellites 12. In that the signal quality is predominantly determined by environmental obstructions local to the user terminal 13, the sky mapping will be unique for each stored, preferred location of the user terminal 13. Because the satellite movements in orbital tracks are deterministic, it can then be predicted when satellites will be in positions in the sky providing favorable communications with the user terminal 13. This data base, along with the stored location, may be transmitted to the gateway 14 for use by the gateway.

Thereafter, repeated calls from a stored, often-used or preferred location of the user terminal 13 may be scheduled for those times when there are favorable satellite positions in the sky. The time of the favorable positions and the durations of favorable conditions may be shown on the user terminal display. Additionally, digital messages (including registration and authentication) could be stored and queued in the user terminal 13 or an associated computer for later automatic transmission when conditions are favorable.

The gateway 14 has knowledge of those favorable times in which to initiate communication with the user terminal 13, provided it has been registered at the indicated stored location. A means of alerting a calling party on the PSTN that a user terminal will be open or available for communication at a later time may be implemented using programmed voice announcements and/or digital messages for display to the calling party.

Figure 5:
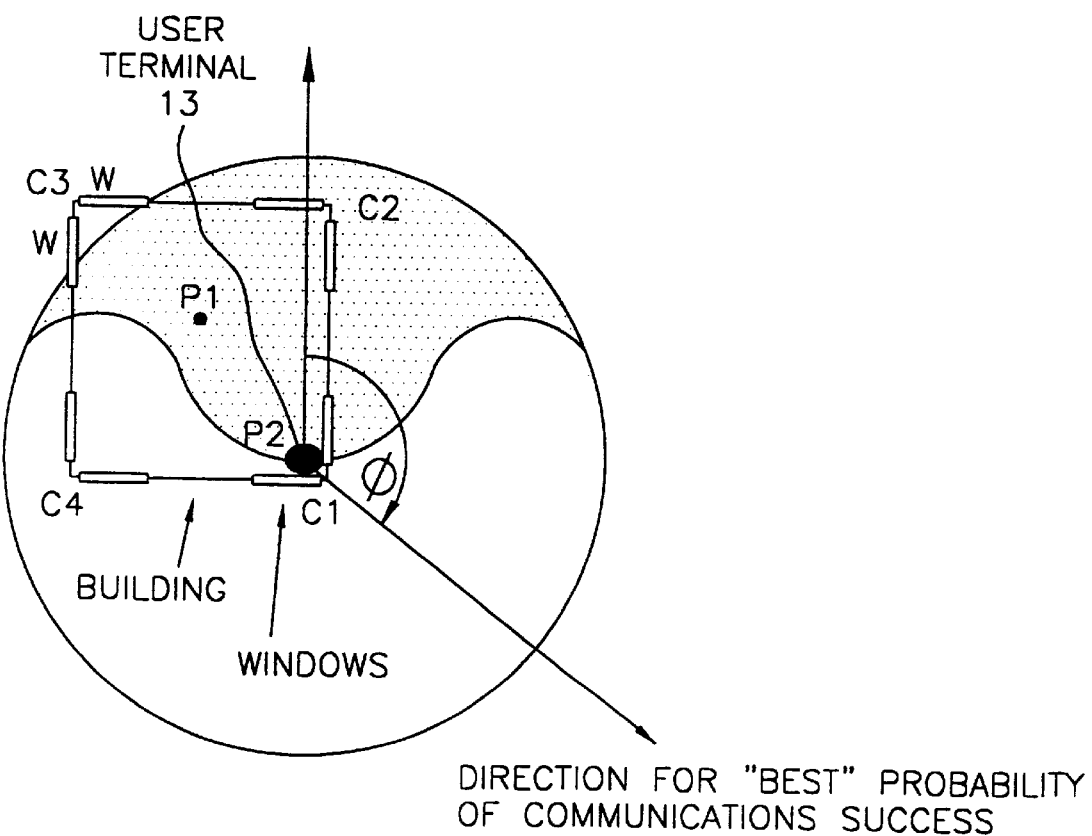
FIG. 5 illustrates the view of the sky of FIG. 4 upon which is superimposed an exemplary windowed building within which the user terminal is located, this Figure being particularly useful in explaining the user instruction feature of this invention.

Reference is now made to FIG. 5 for illustrating one typical example where the certain of the teachings of this invention find utility. In FIG. 5 the user terminal 13 is assumed to be located within a building having windows (W) located in each of four corners (designated as C1–C4). An initial position of the user terminal 13 is indicated as P1. Based on the position of the user terminal 13 (latitude and longitude), and on the relative positions of the satellites A and B as shown in FIG. 4, and on the user terminal's azimuthal orientation, the user can be explicitly or implicitly instructed to move to a position P2 that is adjacent to windows facing the "best direction" (e.g., windows facing the south-east), in this case the windows at corner C1. It should be noted that some portions of the windows in corners C2 and C4 may also provide adequate communications performance.

At least two methods are available for calculating and communicating this information to the user. A first method, illustrated in FIG. 6, employs information that is stored in, and/or that may be calculated by, the user terminal 13. With this capability the user terminal 13 can autonomously determine the best direction and/or location to transmit from in order to maximize the quality of the satellite/user terminal communications link.

Figure 7:
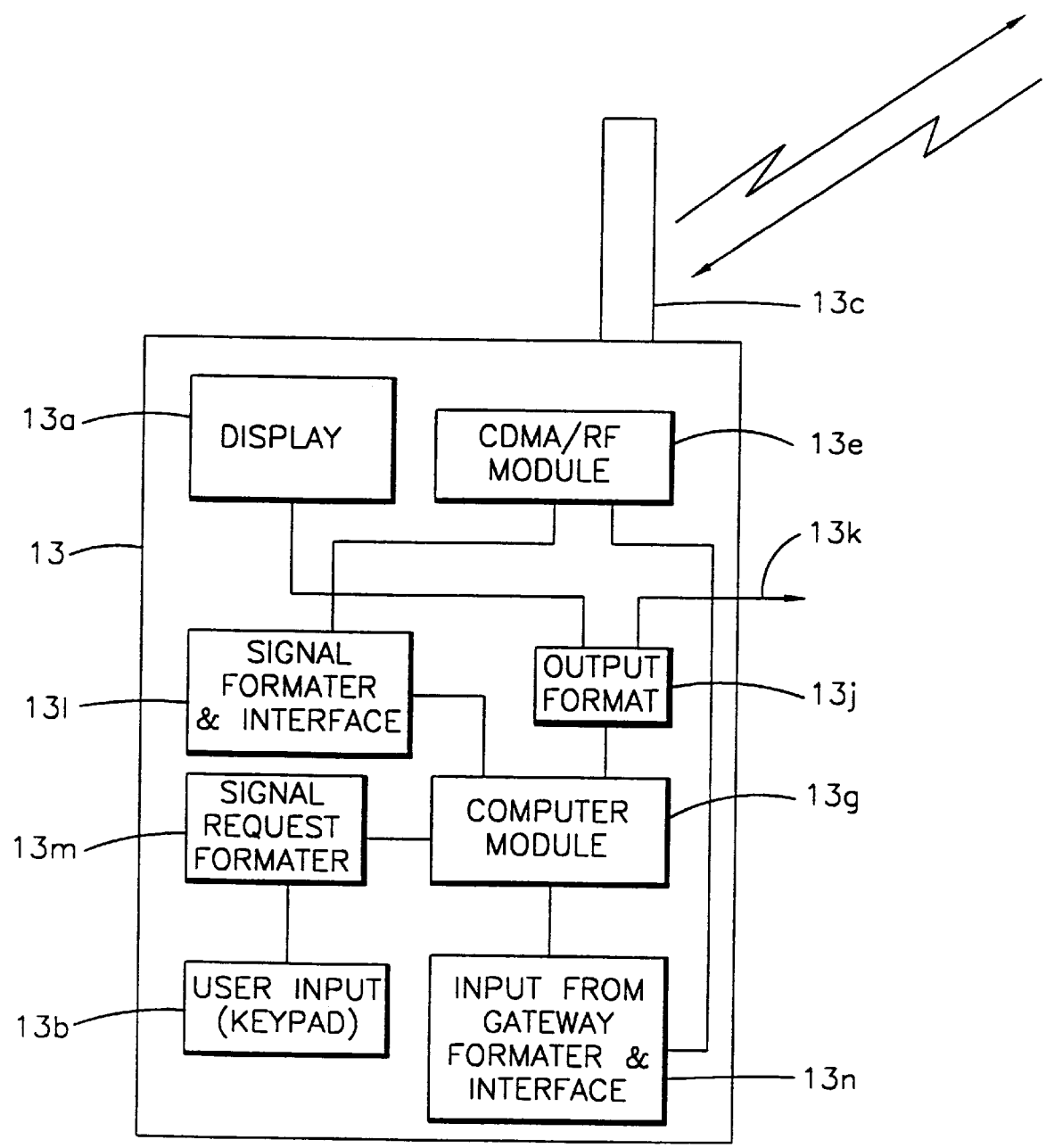
FIG. 7 is a block diagram of a second embodiment of a satellite communications user terminal, specifically a "gateway assisted user information request" embodiment.

A second method, illustrated in FIG. 7, enables the user to request assistance from the gateway 14 to perform the same function. In this case the gateway 14 performs the calculation for the user terminal 13 and sends the resulting information over the RF links 14a and 12b, via at least one of the satellites 12.

An advantage of the first method is that there is little or no information transferred over the satellite relay system, thereby conserving capacity for voice, data, and other traffic. A further advantage of the first method is that it enables a user terminal that is out of communication with a gateway to possibly establish a communication link with the gateway.

As is illustrated in FIG. 8, a further ability of the system 10 is a capability to calculate and predict in the future a "best" situation for communication. For example, a user may wish to receive data through the satellite communications system 10 by leaving his user terminal 13 on and unattended. In this case the required data can be downloaded to the user terminal 13 via the PSTN, gateway 14 and satellite 12. The user terminal 13, in turn, then outputs the data to, by example, an attached computer for storage. For this case, the user could request from the gateway 14 future satellite constellation information. The gateway 14 predicts a range of user terminal positions that would provide the best link quality during the specified time(s). Alternatively, these calculations could be performed by the user terminal itself using, by example, a displayed menu to prompt the user to enter, via the keypad 13b, the required data (e.g., the date and time of day at which the data will be downloaded).

It is also within the scope of this invention to employ a directional antenna for the user terminal antenna 13, which is either mechanically or electrically driven to point in the direction that is determined to maximize the communications link quality. Such a directional antenna need not be expensive, in that it could provide, by example, hemispherical, quarter hemispherical, or more highly directive performance. In any case the output of the user information request system of this invention can be used to either point the antenna in real time, or in accordance with predictive data. Information on satellite locations and best directions according to best choice determination techniques may be downloaded to the user terminal 13 from the gateway 14.

Figure 6:
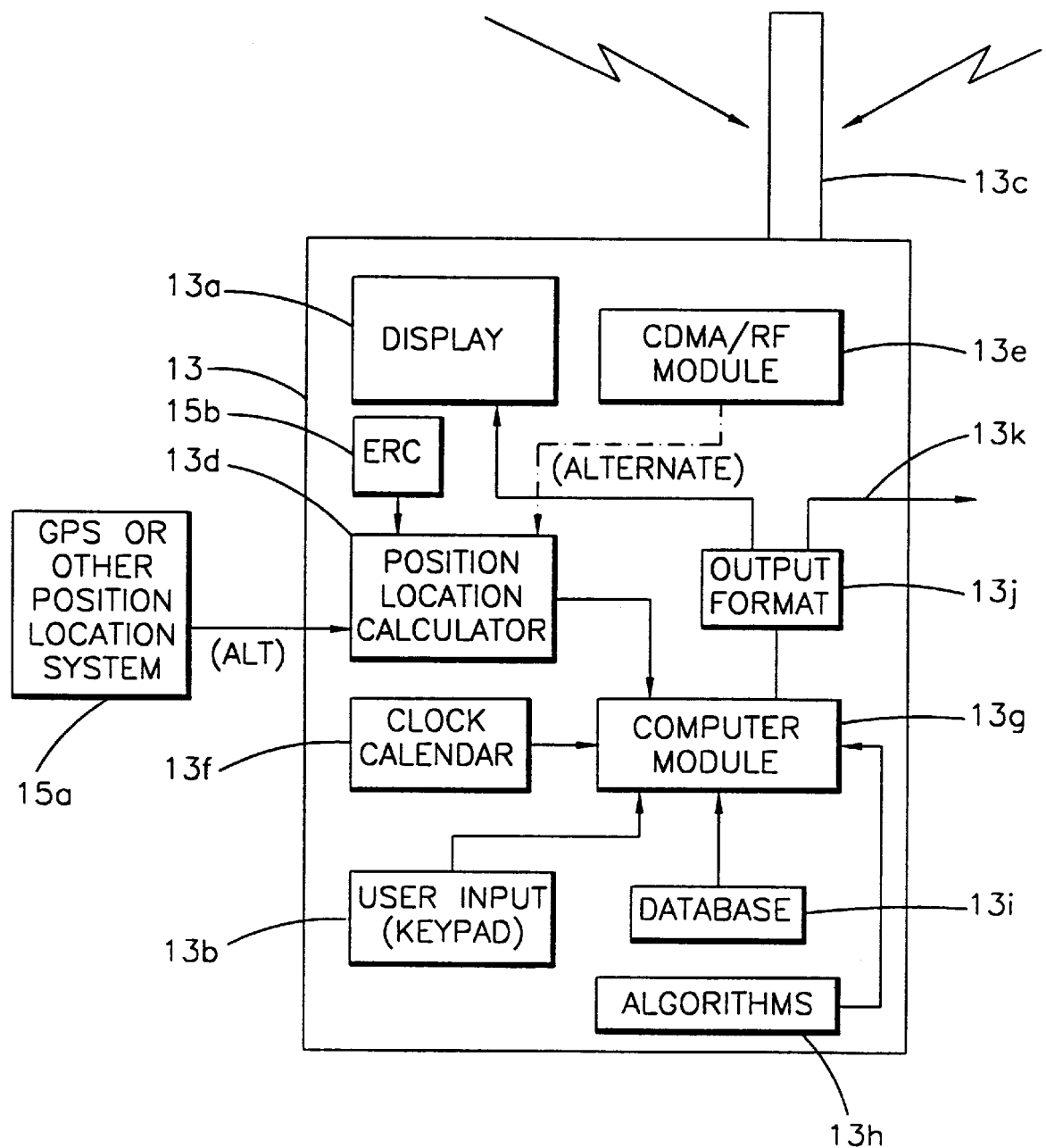
FIG. 6 is a block diagram of a first embodiment of a satellite communications user terminal, specifically a "passive user assist" embodiment.

Referring to FIG. 6, a description is now made of the method of this invention that was referred to above. The user terminal 13 includes a position location calculator 13d that receives an input from, by example, a GPS or other position location system 15a and/or from the satellites themselves and/or from gateway 14 via a satellite 12, the antenna 13c, and a CDMA/RF module 13e. In accordance with an aspect of this invention the position location calculator 13d also receives an input from an electronically readable compass (ERC) 15b which may be located within the user terminal 13. The user terminal 13 also includes a real-time clock and calendar module 13f, and a controller, such as computer module 13g, that provides an ability to calculate under the control of stored algorithms 13h, or look up in a database 13i, the position of the satellites 12. An important input to the computer module 13g is the position (latitude and longitude) and the compass heading (azimuthal orientation) of the user terminal 13. The clock and calendar module 13f establishes an orbital time referenced to some standard, such as Universal Time. Using initial values for the satellite orbits and ephemeris (stored in database 13i) a calculation can be made to develop the azimuthal and elevation angles to the various one or ones of the satellites 12 that are in view of the user terminal 13.

It should be noted that in some embodiments certain of the above-described modules may be located external to the user terminal 13 and interfaced to the user terminal in a suitable manner. For example, for a vehicle-mounted user terminal the ERC 15b may be an electronic compass that is included in the vehicle. In like manner the real time clock 13f could be a time keeping system that is carried by the vehicle.

Referring to FIGS. 9A and 9B, the relative positions of the co-visible satellites with respect to the user terminal 13 can be presented on the display 13a. Additionally the user terminal 13 and satellite 12 positions with respect to compass heading, derived from the ERC 15b can be displayed, as well as the obscura region of the sky that is devoid of satellites. The status of the communication paths to the currently visible satellites 12 can also be displayed, for instance as clear, impaired, or blocked. This information provides the user with the clues necessary to find the best location from which to communicate through the satellites 12 to the gateway 14, and these values can be used in combination to produce the best direction result to obtain optimum communications link performance.

A number of different techniques can be employed and used in accordance with user input from the keypad 13b. For example, a user may choose a Building__Window selection from a displayed menu, which in turn selects an appropriate technique to best fit the user's situation (as in FIG. 5). By example, the gateway 14 first retrieves the user's location, then retrieves the user-provided information (e.g., Building__window), then retrieves the constellation ephemeris (present and/or future), and then calculates the optimum location for the user terminal. The result may then be properly formatted so as to reflect the user's input, such as by instructing the user to position the terminal near to a window at the calculated optimum location. The user could also be prompted for further environment-related information. As but one example, the user could be queried as to which floor of the building the user is located (i.e., the user's elevation). The user's elevation may then be also employed when calculating the optimum location of the user terminal with respect to one or more of the visible (or soon to be visible) satellites of the constellation (generally the higher the elevation the better so as to clear tree tops and lower adjacent buildings). Alternatively, the user could choose a Mountain__Forest selection, and a different technique would be used. In any case the result is displayed or communicated to the user in some manner in an appropriate output format (block 13j). The output need not be displayed on the user terminal's visual display 13a, but could be presented as computer generated voice, or could be routed (path 13k) to an external display means, such as an attached computer terminal, for presentation to the user.

Based on the presented information the user is enabled to optimize his or her location or direction with respect to the satellites 12 that are in view. Alternatively, the result can be outputted in azimuth and/or elevation format for driving some external or internal device with respect to the user terminal 13. For example, a directional antenna can be configured to only transmit and receive from the "best" direction, thereby increasing the user terminal antenna gain, and subsequently reducing the user terminal transmit power.

As was indicated previously, the user may select a time in the future to calculate the "best" direction, by entering selected times with the keypad 13b to the computer module 13g. The computer module 13g then advances the date and time to the selected date and time and performs the best direction calculation. In addition to entering the future date and time, it is also within the scope of the invention to enter a future position of the user terminal, assuming that the position is known with sufficient accuracy.

Alternatively, predictions for a range of times may be made. In this case the user is enabled to select from a displayed list of "best" directions during the range of times, or the user may be informed of a future time that would be optimal for communication with the satellite(s), as a function of the changing constellation configuration during the range of times selected.

Reference is now made to FIG. 7 for showing a user terminal 13 constructed to operate in accordance with the second method of this invention, i.e., the gateway assisted user information request system method. Those components of the user terminal 13 that are common to the embodiment of FIG. 6 are designated accordingly. Reference is also made to FIG. 8, which illustrates in greater detail the components of the gateway 14 that participate in the method.

In the embodiment of FIGS. 7 and 8 the user terminal 13 is not required to calculate the "best" direction, but relies instead on the gateway 14 to perform this function. This has the effect of reducing the complexity of the user terminal 13, at the expense of some increase in over the air signaling. However, the fraction of traffic used for this function is relatively small. Furthermore, the gateway 14 typically will have more up-to-date satellite ephemeris information available than the user terminals 13, and can thus make more precise "best" direction calculations.

Referring to FIGS. 7 and 8, the user terminal 13 may be provided with a signal formatter and interface block 131 that is interposed between the CDMA/RF module 13e and the computer module 13g. A user terminal signal request formatter block at 13m is likewise interposed between-the keypad 13b and the computer module 13g. Interposed between the CDMA/RF module 13e and the computer module 13g is a gateway message formatter and interface block 13n.

Referring now specifically to FIG. 8, the gateway 14 includes a plurality of steerable antennas 14c each of which is connected to an associated CDMA/RF module 14d. Modules 14d are bidirectionally connected to an interface block 14e through which various signals pass. The gateway 14 further includes a user terminal position location calculator 14f, a database of user terminal-related information 14g, a clock calendar module 14h, and a satellite orbital data and ephemeris block 14i. A gateway controller embodied in a computer module 14j operates under the direction of algorithms 14k to interact with the user terminal 13 so as to calculate and transmit "best" direction data to the user terminal 13. To this end the gateway 14 includes a service request block 141 for receiving a service request from the user terminal 13, and also an output format block 14m for providing the requested information back to the user terminal 13 through the interface block 14e, CDMA/RF module 14d, at least one of the antennas 14c, and at least one of the satellites 12. The gateway 14 further includes an interactive user terminal session activation block 14n that is switchably coupled with a switch (designated SW) to one of a signal level measurement module 140 and an environment prompter module 14p. The signal level measurement module 14o can be used for measuring, by example, signal strength, received power, signal quality (e.g., bit error rate), or various combinations of these received signal characteristics.

The first step in the method is for the user terminal 13 to log into the system 10. A portion of the log-on and registration procedure utilizes the user terminal's transmitted signals to determine, in block 14f, the user terminal's position, both in latitude and longitude. The position of the user terminal 13 is then entered into the database 14g. The database 14g of user terminal information is preferably updated as the user terminal 13 receives and makes calls. In this manner the user terminal's location is maintained current in the database 14g. The gateway 14 has knowledge of the satellite constellation ephemeris data (satellite location, orbital motion, and other orbital parameters) from the database 14i, and is enabled to calculate azimuthal and elevation angles to the various satellites 12 that are in view of the determined location of the user terminal 13. These values are then employed to produce the "best" direction result for the user terminal 13, which is then transmitted back to user terminal 13. Various ones of different gateway algorithms may be available to act in accordance with user terminal input.

The operation of the embodiment of FIG. 8 is as follows. It is assumed for this embodiment that the user desires to gain access to information that enables the user to attain an optimal location from which to communicate with one or more of the satellites 12. The user first signals via the keypad 13b or other type of input device (e.g., voice or computer data) the gateway 14 that a request for information service is desired. The user may select from a menu delivered to the display 13a, or to some other type of suitable output device, the type of service desired. As was described with respect to FIG. 6, the user may choose "Building-Window" from a displayed menu. This request for service is formulated by the computer module 13g and is transmitted via the signal request formatter 13m, CDMA/RF module 13e, antenna 13c, and at least one of the satellites 12, to the gateway 14. The service request signal is received by the gateway 14, processed as a service request in block 141, and is acted upon by the computer module 14j, in cooperation with the algorithms block 14k, to calculate "best" direction result. After the "best" direction result is determined it is formatted onto a data stream in block 14m and sent from the gateway 14 to the satellite 12, and thence to the requesting user terminal 13. The received "best" direction result is routed through the block 13n in the user terminal 13, is formatted into textual, aural, or some other suitable format, and is presented to the user in a user-perceptible format. Alternatively, the result, expressed in or converted to azimuth and/or elevation, can be used to point a user terminal directional antenna, as was described previously.

Another feature of the gateway assisted user information system of this invention is a capability of providing interactive user position assistance. In this mode of operation the user generally desires more information than can be readily communicated via the second method described above. In this case the user activates an interactive session with the gateway 14, which request is routed to and acted upon by the block 14*n*, and generally involves a measurement of one or more parameters of the user terminal signal characteristics as received by the gateway 14. This enhanced method begins with the user sending a service request signal that specifies interactive service. In response, the computer module 14*j*, in cooperation with the interactive session activation block 14*n*, establishes an interactive session. The user terminal location is retrieved from the database 14*g*, or is determined anew, the satellites positions and ephemerides is calculated as before using the database 14*i*, and the "best" location using an appropriate one of the algorithms 14*k* is determined. Next, the user terminal 13 is signaled to burst a reference tone. After receiving and decoding this request the user terminal 13 processes the gateway request and responds with a reference signal burst. The reference signal burst is received by the gateway 14 and processed, such as by routing the received reference burst via the switch to the signal level measurement module, and determined signal characteristic values are compared with reference values. From this data the gateway 14 is enabled to determine if the user terminal 13 is blocked or otherwise obstructed in the direction to one or more of the satellites 12. If the user terminal 13 is determined to not have free access to one or more of the visible satellites, the gateway 14 refines the determined "best" direction, such as by selecting another combination of satellites. The "refined best" direction can be combined with the gateway's predictive capability for the next several minutes. In any case, the gateway 14 issues appropriate instructions to the user terminal 13 that takes into account any signal blockages, or impending signal blockages based on the user terminal's current location and the position of the satellites at some future time. These instructions are formatted onto a data stream as before, and sent from the gateway 14 to one or more of the satellites 12 and thence to the user terminal 13. The result is decoded in the user terminal 13, formatted into a user perceptible format, and presented to the user. By using repetitive requests and interactions of this type the user can be guided to a position which maximizes the user's communications capability.

For paging operations, the gateway 14 is enabled to select a most favorable time to page the user terminal 13. By example, and assuming that the second method of interactive user position assistance has been accomplished, the gateway 14 predicts when the satellite(s) 12 would be at the most advantageous positions for future communication with the user terminal 13. For paging, the user terminal 13 is preferably then left in the location from which the interactive user position assistance exchange with the gateway 14 took place, e.g. on a table top or window sill. Moving the user terminal 13 by a significant amount could potentially invalidate the previously determined interactive user position assistance data.

A further interactive method may be employed to communicate additional information to the user. In this case the user supplies information that assists the gateway 14 in predicting a best course of action for the user to maximize the user's communications potential. This further method begins, as with the previously described enhanced method, with the user sending a service request signal that specifies interactive service. In response, the computer module 14*j*, in cooperation with the interactive session activation block 14*n*, establishes an interactive session. The user terminal location is retrieved from the database 14*g*, or is determined anew, the satellite position and ephemeris is calculated as before using the database 14*i*, and the "best" location using an appropriate one of the algorithms 14*k* is determined. The user terminal 13 is then prompted by the environment prompter module 14*p* to display a request for more information from the user. For example, the user is requested to enter information that is descriptive of the user's general environment, such as by selecting from a displayed menu of choices. Exemplary choices could include: IN BUILDING, ADJACENT TO BASE OF CLIFF, OUTDOORS-NEXT TO BUILDING, IN AIRPLANE, etc. The user terminal 13 may either transmit the user's selection immediately to the gateway 14, or store the selection for later transmission. The gateway 14 or the user terminal 13 computer module (13*g*, 14*j*) may respond to the user's initial input with further queries that are based on the user's response to the initial query. For example, if the user responded to the initial question with "IN BUILDING", then the second question may be "WHICH SIDE?" followed by the display of a plurality of directions (N, NE, E, SE, S, . . . ), to which the user responds by selecting, if known, which side of the building that the user is closest to.

As was described previously, from this user-supplied data the gateway 14 is enabled to determine if the user terminal 13 is blocked or otherwise obstructed in the direction to one or more of the satellites 12. If the user terminal 13 is determined to not have free access to one or more of the visible satellites, the gateway 14 refines the determined "best" direction, such as by selecting another combination of satellites. The "refined best" direction can be combined with the gateway's predictive capability for the next several minutes. The end result is the issuance of an instruction to the user terminal 13 which prompts the user to take some action to improve or optimize the quality of the user terminal/satellite communications link. By example, and in accordance with the example given above, if the user responds with "SE" to the question "WHICH SIDE?", the gateway-determined instruction may be "MOVE TO SW SIDE FOR NEXT 10 MIN."

It should be realized that the user terminal 13, or the gateway 14, may also issue an instruction to the user during a telephone or data communication if it is determined that the originally specified "best" user direction or location is no longer the most optimum. That is, as the relative positions of the satellite(s) 12 change during the connection it may be the case that the user should also change location in order to maintain an optimum communications path direction to the satellite(s). In accordance with the foregoing example, and assuming that the initial user instruction was "MOVE TO SW SIDE FOR NEXT 10 MIN.", a subsequent instruction can be issued during an established voice and/or data communications link such as "MOVE TO SW SIDE TO CONTINUE CALL".

Also, the invention has been described in the context of RF links that employ Code Division, Multiple Access (CDMA). This particular modulation and access technique is presently preferred for the system 10, but is not a limitation on the practice of this invention. By example only, Time Division, Multiple Access (TDMA) techniques can also be used, as can hybrid CDMA/TDMA techniques.

Furthermore, and although described in the context of a constellation of LEO satellites, other orbital configurations can be used, such as a constellation of inclined circular orbits having an altitude of, by example, 5500 nautical miles or greater.

Also, in the presently preferred embodiments of this invention the satellites 12 function as "bent pipe" repeaters that receive, frequency translate, and transmit the RF links 12b and 14a, without regard for any informational content of the communications traffic signals. However, it is within the scope of this invention to provide all or some of the satellites 12 with some degree of on-board signal processing capability and/or inter-satellite links, and to thus perform all or some of the user position determination, satellite position determination, optimum user location determination and instruction methods described above on-board the satellite (s). The satellite or satellites 12 can also be used to place an on-going call on hold, as described above, such as when the user is moving to a better location.

Thus, while the invention has been particularly shown and described with respect to preferred embodiments thereof, it will be understood by those skilled in the art that changes in form and details may be made therein without departing from the scope and spirit of the invention.

What is claimed is:

1. A method for operating a satellite communications system having a plurality of earth orbiting satellites, at least one terrestrial user terminal, and at least one terrestrial gateway, comprising the steps of:
   determining a location and an orientation of the user terminal;
   determining locations of one or more satellites co-visible to the user terminal and the gateway;
   determining a signal quality of paths to each satellite co-visible with the gateway;
   displaying a representation to an operator of the user terminal, the representation depicting at least the orientation of the user terminal, the determined locations of the one or more satellites, and the determined signal qualities; and
   changing the location of the user terminal in response to the displayed representation.

2. A method as in claim 1, wherein the step of determining a location of the user terminal includes the steps of:
   prompting the operator to input information descriptive of an environment of the user terminal; and
   determining the location also in accordance with the information that is inputted by the operator.

3. A method as in claim 1, wherein the step of determining locations of one or more satellites uses a current time and date.

4. A method as in claim 1, wherein the step of determining locations of one or more satellites uses a future time and date.

5. A method as in claim 4, and further comprising a step of:
   prompting the operator to input a future time and date; and
   determining the locations of the one or more satellites in accordance with the future time and date that is inputted by the operator.

6. A method as in claim 1, wherein the step of determining the locations of the one or more satellites includes a step of determining an elevation angle of each of the one or more satellites relative to the determined location of the user terminal, and wherein the step of displaying also displays a representation of the determined elevation angle.

7. A method as in claim 1, wherein the step of determining locations of one or more satellites employs satellite ephemerides data that is stored in at least one of the user terminal or the gateway.

8. A method as in claim 7, and for the case where the satellite ephemerides data is stored in the user terminal, further comprising an initial step of transferring all or part of the satellite ephemerides data from the gateway to the user terminal through at least one satellite.

9. A method as in claim 1, wherein the step of displaying includes an initial step of transmitting path quality information from the gateway to the user terminal through at least one satellite.

10. A method as in claim 1, wherein the step of displaying includes a step of displaying a graphic presentation of the sky which comprises indications of the location, elevation angle and direction of movement of the co-visible satellites, and also an azimuthal orientation of the user terminal.

11. A method as in claim 1, wherein the step of displaying includes a step of displaying a graphic presentation of the sky which comprises an indication of an obscura region of the sky that is devoid of satellites.

12. A method as in claim 1, wherein the step of displaying includes a step of displaying a representation of satellite paths that are in use by the user terminal, and an indication of the signal quality of those satellite paths that are in use and also those that are not in use.

13. A method as in claim 1, and further comprising preliminary steps of:
   positioning the user terminal at a predetermined location; and
   operating the user terminal over a period of time so as make a stored record of satellite availability at the predetermined location.

14. A method as in claim 13, and further comprising a step of transmitting the record from the user terminal to the gateway for storage.

15. A method as in claim 14, wherein at least one of the user terminal or the gateway makes a call set-up decision using the stored record, a current time, and a current location of the user terminal.

16. A method for operating a satellite communications system having a plurality of earth orbiting satellites, at least one terrestrial user terminal, and at least one terrestrial gateway, comprising the steps of:
   positioning the user terminal at a predetermined location; and
   operating the user terminal over a period of time so as make a stored record of satellite availability at the predetermined location.

17. A method as in claim 16, and further comprising a step of transmitting the record from the user terminal to the gateway for storage.

18. A method as in claim 17, wherein at least one of the user terminal or the gateway makes a call set-up decision using the stored record, a current time, and a current location of the user terminal.

19. A method for operating a satellite communications system having a plurality of earth orbiting satellites, at least one terrestrial user terminal, and at least one terrestrial gateway, comprising the steps of:
   storing in the user terminal a record of at least one predetermined geographical location from where the user terminal is expected to desire communication, and an indication of satellite availability at the at least one location over a period of time;
   transmitting the stored record to the gateway that serves the user terminal for storage in the gateway; and
   subsequently establishing communication with the user terminal in accordance with at least one of the stored records.

20. A method as in claim 19, wherein the step of storing in the user terminal includes steps of:

receiving signals from satellites over a sufficiently long period of time to accumulate a record of received signal quality; and associating the received signal quality record with stored satellites ephemerides data to create a map of the sky with received signal quality associated with positions of the satellites.

21. A method as in claim 20, wherein the step of establishing communication includes steps of:

predicting when satellites will be in positions in the sky providing favorable communications with the user terminal; and scheduling scheduling a future communication from the location to coincide with favorable satellite positions in the sky.

22. A method as in claim 21, wherein the step of scheduling includes a step of displaying to an operator of the user terminal at least a time of occurrence of the favorable satellite positions and a duration of the favorable satellite positions.

23. A method as in claim 21, and further comprising a step of storing a queue of messages for later automatic transmission during a time when it is predicted that satellites will be in positions in the sky providing favorable communications with the user terminal.

24. A method as in claim 21, and further comprising a step of initiating at the gateway a communication with the user terminal during a time when it is predicted that satellites will be in positions in the sky providing favorable communications with the user terminal, when the user terminal has registered at the predetermined location.

25. A method as in claim 24, wherein the step of initiating comprises a step of alerting another party that the user terminal will be available for communication at the predicted time.

26. A satellite communications system, comprising:

a plurality of satellites;

at least one terrestrial gateway; and at least one terrestrial user terminal comprising a transceiver for conducting bidirectional communications with said gateway through at least one satellite of said plurality of satellites;

said system further comprising means for determining a location and an orientation of the user terminal, for determining locations, relative to the location of said user terminal, of one or more satellites that are co-visible to said user terminal and to said gateway, and for determining a signal quality of paths to each satellite that is co-visible with the gateway;

wherein said user terminal further comprises a display for displaying a representation to an operator of the user terminal, the representation depicting at least the determined orientation of the user terminal, the determined locations of the one or more satellites, and the determined signal qualities.

27. A system as in claim 26, wherein said determining means further determines a current elevation angle of each of the one or more satellites relative to the determined location of said user terminal, and wherein said display also displays a representation of the determined elevation angle.

28. A system as in claim 26, wherein said determining means employs satellite ephemerides data that is stored in at least one of said user terminal or said gateway.

29. A system as in claim 26, wherein said display further displays a graphic presentation of the sky which comprises indications of the location, elevation angle and direction of movement of said co-visible satellites, and also an azimuthal orientation of said user terminal.

30. A system as in claim 26, wherein said display further displays a graphic presentation of the sky which comprises an indication of an obscura region of the sky that is devoid of satellites.

31. A system as in claim 26, wherein said display further displays a representation of satellite paths that are in use between said user terminal and one or more satellites, and a representation of a signal quality of those satellite paths that are in use and also those that are not in use.

32. A system as in claim 26, and further comprising:

a controller in said user terminal for operating said user terminal over a period of time at a certain location so as to store a record of satellite availability at the certain location, said controller transmitting the stored record from said user terminal to said gateway for storage, wherein at least one of said user terminal or said gateway makes a call-related decision using the stored record, a current time, and a current location of the user terminal.

33. A satellite communications system, comprising:

a plurality of satellites;

at least one terrestrial gateway; and at least one terrestrial user terminal comprising a transceiver for conducting bidirectional communications with said gateway through at least one satellite of said plurality of satellites;

said user terminal further comprising a controller for operating said user terminal over a period of time at a certain location so as to store a record of satellite availability at the certain location, said controller transmitting the stored record from said user terminal to said gateway for storage such that at least one of said user terminal or said gateway makes a call-related decision using the stored record, a current time, and a current location of the user terminal.

* * * * *